Patented Apr. 19, 1938

2,114,692

UNITED STATES PATENT OFFICE 2,114,692

COATING PROCESS

Julian P. Ward, Cleveland, Ohio; Frank Pelton, administrator of Julian P. Ward, deceased, assignor to The General Coating Company, Cleveland, Ohio, a corporation of Ohio No Drawing. Application February 25, 1936, Serial No. 65,685

4 Claims. (Cl. 91—68)

This invention relates to a coating process and coated products produced thereby.

The principal object is to produce coatings of superior character and application properties upon surfaces of lithic substances such as granular or massive stone, glass, quartz, slate, enamel, concrete, ceramic material, cement, cement-asbestos combinations, slag, chat, asbestos, diatomaceous earth, etc.

Broadly stated, the invention consists in producing a coating of superior inertness and application properties by reacting on one or a mixture of alkali silicates, aluminum hydrate or similar colloid forming, amphoteric compounds such as the hydrates of chromium, zinc, lead, manganese and tin with one or a mixture of alkali or alkaline earth fluosilicates, in aqueous mixture, on the surface to be coated. If all the above named ingredients are brought together and allowed to stand for any considerable period of time before being applied, the reaction will proceed so far that the mixture will substantially thicken so that the coating cannot be readily applied in economic proportion, and will ultimately solidify. I therefore do not mix all the ingredients together until just prior to application to the surface to be coated. A desirable procedure, which I term the wet process, is to thoroughly admix the silicate and aluminum hydrate together with the desired pigment (a metal oxide substantially free from water soluble material) as by grinding in a stone mill, ball mill or the like and separately mix the fluosilicate with water by agitation. I then bring the two mixtures together with agitation and apply the resulting mixture to the surface to be coated before the reaction has proceeded to any great extent. In the case of the compositions described below and similar ones the application to the surface to be coated should be completed within a few minutes, not more than 30, after the solutions are mixed. Pigments such as chromium oxide and iron oxide, substantially free from soluble matter, remain inert but are properly held by the reaction products.

A typical formula for the dry portion would be

|  | Parts by weight |
|---|---|
| Sodium silicate | 300 |
| Chromium oxide | 60 |
| Aluminum hydrate | 40 |

Potassium fluosilicate, alone or mixed in any proportion with sodium or other alkali silicate or silicates may be used as the silicate; and any inert, water soluble metal oxide pigment substantially free from water soluble matter, may be used. Proportions should be varied to compensate approximately for the differences in molecular weight.

And for the aqueous part:

|  | Parts by weight |
|---|---|
| Barium fluosilicate | 70 |
| Water | 100 |

Sodium, potassium, strontium, magnesium and calcium fluosilicates may be substituted to any desired extent (one or any mixture thereof) for barium fluosilicate.

It is desirable to select proportions according to the theoretical quantities required by the reaction with the exception of pigment and water which may be proportioned according to choice, the coloring effects desired and the fluidity of the mixture dictated by manufacturing practice. Some residues of reactants may be tolerated, but for best results they should be substantially eliminated.

When the above indicated substances are brought together, a series of reactions occur, which progress relatively rapidly at first, gradually slowing down, and which are roughly represented by the following equations:

(1) $3Na_4Si(OH)_8$ (in contact with the fluosilicate) $\rightarrow 12NaOH + 3Si(OH)_4$ (2) $3Na_2SiF_6 + 12NaOH + 3Si(OH)_4 + 4Al_2(OH)_6 + xSi(OH)_4 +$ pigment $\rightarrow 6NaF + 2Na_3AlF_6 + 6NaAlSiO_4 + 24H_2O + xSi(OH)_4 +$ pigment.

It will be observed that the products of the reaction in addition to a small amount of sodium fluoride, water and the non-reacting substances have compositions corresponding to those of the minerals cryolite and feldspar. They may therefore be termed artificial cryolite and artificial feldspar.

No attention need be paid to temperatures until after the application of the reacting mixture to the surfaces to be coated. Even after this point, the temperature need not be controlled. However, the reaction continues for a long time (the order of ten days) at normal temperatures (e. g. 70° F.) but is very much accelerated by the elevation of the temperature. I prefer to heat the freshly treated material to about 120° F. until the free moisture is removed and then to 250° F. in a current of warm air whereby to facilitate further removal of moisture. By this procedure the coated surfaces become dry to the touch in four to seven minutes and after elevation of the temperature are reduced to a moisture content of about 13%.

Numerous materials of the type indicated as suitable for receiving the coating material above described contain free lime which comes into contact with and damages the coating. Accordingly in the case of this type of material, I first treat the same to render it permanently neutral. A satisfactory procedure for this purpose is to treat the surface with ammonium phosphate. This reacts with the free lime to form insoluble calcium phosphate and liberate ammonia and water. The ammonia and water pass off and leave a neutral surface which has its interstices filled to a substantial depth with calcium phosphate with the result that the free lime, if any, remaining will never escape and injure the coating. The quantity of ammonium phosphate should be calculated according to the amount of free lime in the material to be coated, and the permeability of such material which factor will affect the depth to which the deposit of calcium phosphate will be made. It is desirable that the temperature should be elevated to, for example, about 230° F.

In cases where the coating mixture is made up and applied at the factory, no problem of transportation or storage will arise, but where it is desired to sell the mixture in containers for general distribution for structural work, the cost of transporting and maintaining water solutions above the freezing point must be considered. If the water solutions should freeze, the properties will be changed and the material will become unsatisfactory. A typical formula for distribution in the dry state is as follows, two mixtures to be provided and mixed on the job.

*Mixture (a)*

| | Parts by weight |
|---|---|
| Dry silicate ($Na_2O.3\frac{1}{4}SiO_2$) | 280 |
| Chromium oxide | 110 |
| Aluminum hydrate | 80 |

(All these ingredients should be finely divided and thoroughly admixed.)

*Mixture (b)*

| | Parts by weight |
|---|---|
| Sodium fluosilicate | 100 |
| Chromium oxide | 10 |

While all the pigment may be in Mixture (a), somewhat better mixing is secured by dividing it between the two mixtures.

When these mixtures are to be used, 470 parts of Mixture (a) should be dissolved in 380 parts of water and 110 parts of (b) should be dissolved in 100 parts of water and the two aqueous mixtures should be left overnight and mixed the next day at the time of use. The coating produced by the "dry" process, just described, is identical to that produced in the wet process, the addition of water producing an equivalent composition having in every respect the composition and properties of the material made up with the soluble silicates, first described. The same remarks apply to both processes as to proportions and temperature and the preparation of the surfaces to be coated. In the case of both procedures, when exposed at about 20° C. the water content will fall very rapidly to about 16% and, after remaining in the atmosphere from ten to fourteen days, will reach approximately 13% which is the optimum water content for the best coating properties. The material will remain indefinitely in equilibrium with atmospheric moisture at about this water content.

Having thus described my invention, what I claim is:

1. A coating process comprising forming intimate mixtures, one consisting essentially of alkali silicate and aluminum hydrate, the other consisting essentially of a fluosilicate of an element of the group consisting of the alkali and alkaline earth metals and magnesium, one or both of said mixtures containing a pigment and one or both thereof containing water, bringing said mixtures together and applying the resulting mixture as a coating to a substantially neutral lithic surface before substantial thickening has occurred.

2. A coating process comprising forming intimate, dry mixtures, one consisting essentially of an alkali metal silicate, a metal oxide pigment and aluminum hydrate, the other consisting essentially of a fluosilicate of an element of the group consisting of alkali and alkaline earth metals and magnesium and pigment, adding water to said mixtures, allowing the same to stand, mixing the resulting aqueous mixtures and then applying the resulting mixture to a lithic surface as a coating before substantial thickening has occurred.

3. A coating process comprising forming intimate mixtures, one consisting essentially of alkali silicate and colloid forming amphoteric hydrate, the other consisting essentially of a fluosilicate of an element of the group consisting of the alkali and alkaline earth metals and magnesium, one or both of said mixtures containing a pigment and one or both thereof containing water, bringing said mixtures together and applying the resulting mixture as a coating to a substantially neutral lithic surface before substantial thickening has occurred.

4. A coating process comprising forming intimate, dry mixtures, one consisting essentially of an alkali metal silicate, a metal oxide pigment and colloid forming amphoteric hydrate, the other consisting essentially of a fluosilicate of an element of the group consisting of alkali and alkaline earth metals and magnesium and pigment, adding water to said mixtures, allowing the same to stand, mixing the resulting aqueous mixtures and then applying the resulting mixture to a lithic surface as a coating before substantial thickening has occurred.

JULIAN P. WARD.